(12) United States Patent
Collins et al.

(10) Patent No.: US 9,577,489 B2
(45) Date of Patent: Feb. 21, 2017

(54) MOTOR WITH SEALED CONTROLLER HOUSING

(71) Applicant: Nidec Motor Corporation, St. Louis, MO (US)

(72) Inventors: Michael T. Collins, St. Louis, MO (US); Prakash B. Shahi, St. Louis, MO (US); Jeffrey S. Sherman, Creve Coeur, MO (US); Joseph A. Vehige, Saint Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 248 days.

(21) Appl. No.: 14/267,756

(22) Filed: May 1, 2014

(65) Prior Publication Data
US 2015/0318752 A1    Nov. 5, 2015

(51) Int. Cl.
*H02K 5/12*  (2006.01)
*H02K 5/22*  (2006.01)
*H02K 5/04*  (2006.01)
*H02K 5/18*  (2006.01)
*H02K 11/00* (2016.01)
*H02K 5/10*  (2006.01)
*H02K 1/18*  (2006.01)
*H02K 5/00*  (2006.01)
*H02K 5/16*  (2006.01)

(52) U.S. Cl.
CPC .............. *H02K 5/225* (2013.01); *H02K 1/185* (2013.01); *H02K 5/00* (2013.01); *H02K 5/04* (2013.01); *H02K 5/10* (2013.01); *H02K 5/18* (2013.01); *H02K 11/0073* (2013.01); *H02K 11/33* (2016.01); *H02K 5/161* (2013.01)

(58) Field of Classification Search
CPC .................................... H02K 5/18; H02K 5/04
USPC .......................................... 310/88, 89, 68 D
See application file for complete search history.

(56) References Cited

U.S. PATENT DOCUMENTS

| | | | | |
|---|---|---|---|---|
| 5,006,744 A | * | 4/1991 | Archer | H02K 11/33 310/58 |
| 5,932,942 A | * | 8/1999 | Patyk | H02K 11/33 310/58 |
| 5,939,807 A | * | 8/1999 | Patyk | H02K 5/161 310/64 |
| 7,049,515 B1 | | 5/2006 | Collins et al. | |
| 7,602,095 B2 | * | 10/2009 | Kusase | H02K 19/22 310/114 |
| 8,314,526 B2 | * | 11/2012 | Fukuda | F02B 63/04 310/87 |

* cited by examiner

*Primary Examiner* — Hanh Nguyen
(74) *Attorney, Agent, or Firm* — Hovey Williams LLP (57) ABSTRACT

An electric motor is provided. The motor is mountable to a machine. The motor includes a rotor rotatable about an axis, a stator, a housing, and a fastener. The housing includes a first endshield and a controller can, with the stator being positioned axially between the endshield and the can. The fastener extends through and interconnects the first endshield, the stator, and the can. The fastener projects axially beyond at least one of the first endshield and the can for connection to the machine.

32 Claims, 11 Drawing Sheets

MOTOR WITH SEALED CONTROLLER HOUSING

BACKGROUND OF THE INVENTION

1. Field of the Invention

The present invention relates generally to an electric motor mountable to a machine. More particularly, the present invention concerns a motor including a rotor, a stator, a housing, and a fastener, wherein the fastener extends through the stator and the housing and projects beyond one end of the housing for connection to the machine.

2. Discussion of the Prior Art

Those of ordinary skill in the art will appreciate that electric motors are used in a variety of machines, including but not limited to appliances such as air conditioners. For instance, the condenser unit of an air conditioner might include an electric motor to drive the condenser fan. In many configurations, the condenser unit is located outdoors. In such cases, the motor may be exposed to moisture and/or other contaminants from the environment. Yet further, the motor may be exposed to moisture originating in the condenser unit during the course of normal operation. The orientation of the motor, combined with its specific configuration, may predispose it to the detrimental ingress of such moisture and/or contaminants onto interior motor components such as the stator and/or controller.

SUMMARY

According to one aspect of the present invention, an electric motor is provided. The motor is mountable to a machine. The motor comprises a rotor rotatable about an axis, a stator, a housing, and a fastener. The housing includes a first endshield and a controller can, with the stator being positioned axially between the endshield and the can. The fastener extends through and interconnects the first endshield, the stator, and the can. The fastener projects axially beyond at least one of the first endshield and the can for connection to the machine.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
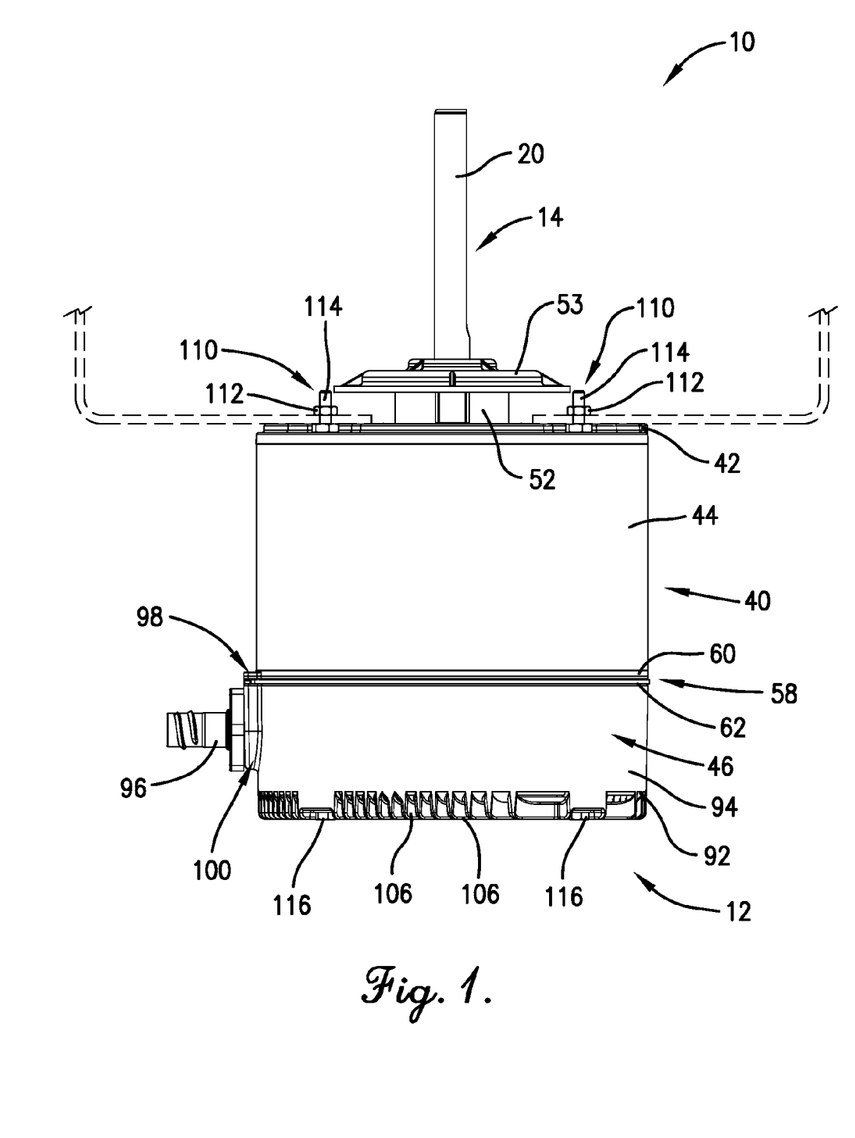
FIG. 1 is a side view of a machine and motor in accordance with a first preferred embodiment of the present invention, wherein the motor is mounted on the machine in a shaft up configuration.
Figure 2:
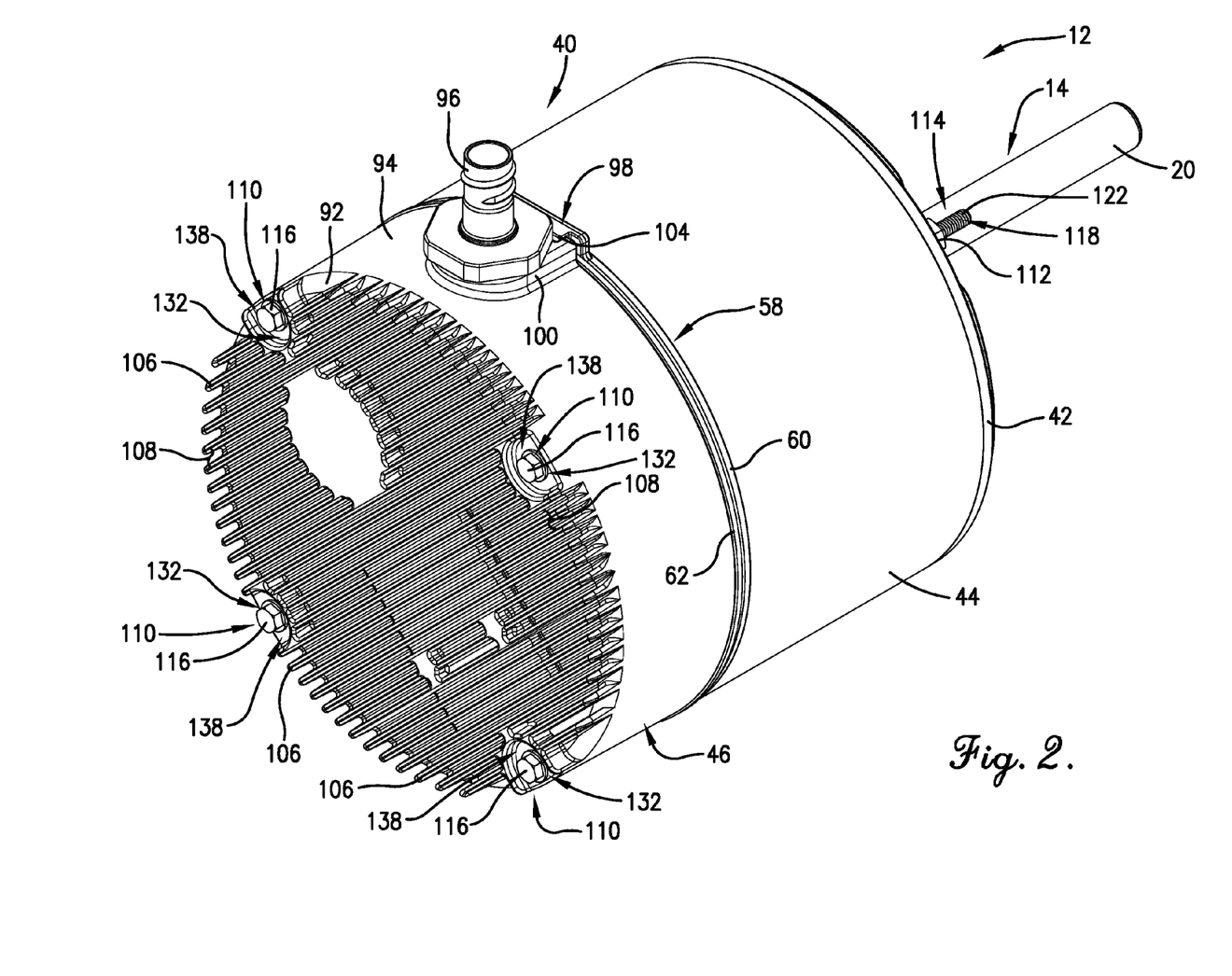
FIG. 2 is an enlarged bottom perspective view of the motor of FIG. 1.

With initial reference to FIG. 1, a machine 10 is provided. The machine 10 may be any one of a variety of machines, including but not limited to an electric vehicle or an appliance. Preferably, the machine 10 is a condenser unit of an air conditioner. More preferably, the machine 10 is an outdoor condenser unit of an air conditioner, although indoor installations are also permissible. Regardless of whether the installation occurs indoors or outdoors, the machine 10 is potentially exposed to moisture and other contaminants (e.g., dust and pollen) from its surroundings, although it is permissible for the machine to be in a protected location so as to minimize such exposure.

Figure 5:
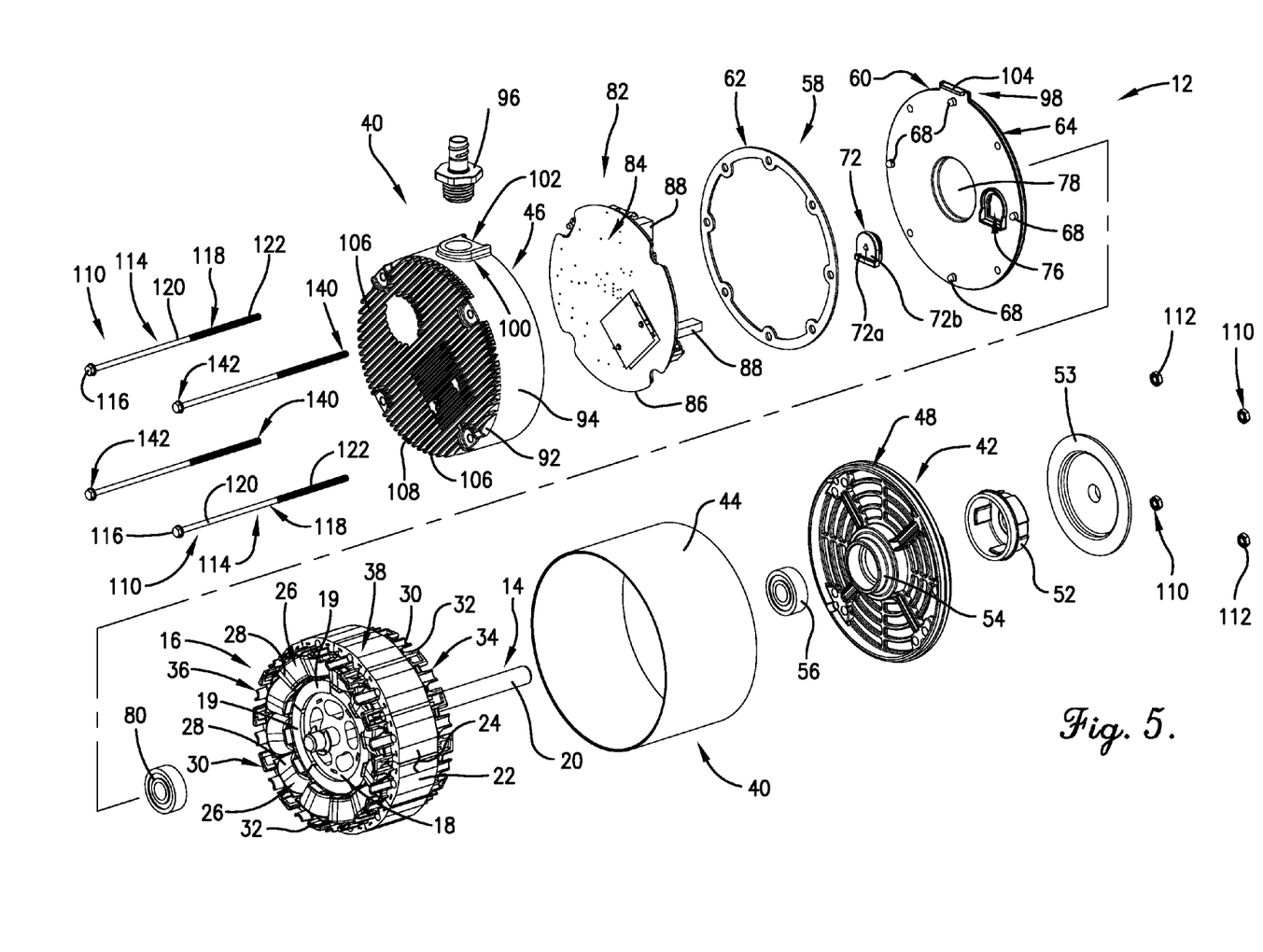
FIG. 5 is a partially exploded bottom perspective view of the motor of FIGS. 1-4, particularly illustrating the interrelationships between the motor components.

As shown in FIG. 1, an electric motor 12 is mounted to the machine 10. The motor 12 preferably includes a rotor 14 and a stator 16. As best shown in FIG. 5, the rotor 14 preferably includes a core 18, a plurality of magnets 19 arcuately arranged about the outer perimeter of the core 18, and a shaft 20. However, alternative rotor arrangements are permissible. For instance, magnets might be spaced about the inner perimeter of the core or about both perimeters.

The rotor 14 is preferably rotatable about an axis at least in part defined by the shaft 20. However, an alternative rotation axis is permissible according to the present invention. For instance, the rotation axis might at least in part be parallel to but spaced from the shaft.

The stator 16 preferably includes a core 22 presenting an outer circumferential face 24 and a plurality of coils 26 wound about the core 22. The coils 26 are preferably formed from electrical wiring 28. The wiring may be formed of any one or more of a variety of electrically conductive materials, including but not limited to copper and aluminum.

Insulative structures 30 having axially outermost ends 32 are also preferably provided. However, it is within the scope of the present invention for alternatively configured insulation or even no insulation to be provided. For instance, the stator core 22 might alternatively be provided with electrically insulative powder-coating.

As will be discussed in greater detail below, the stator 16 preferably presents a generally radially extending first stator margin 34, a generally radially extending second stator margin 36 spaced axially from the first stator margin 34, and a generally circumferentially extending third stator margin 38 extending between and interconnecting the first and second stator margins 34 and 36.

In the illustrated embodiment, each of the first and second stator margins 34 and 36, respectively, is substantially flat, in the sense that it is defined based on structures (in particular, the axially outermost ends 32 of the insulative structures 30) that extend generally along a plane that is perpendicular to the rotor 14 axis. However, the principles of the present invention are equally applicable to one or both of the first and second stator margins having a contour, such as undulations or curved or sloped surfaces, whereby the margins are not generally flat faces spanning the area generally bounded by the circumferential third margin.

The third stator margin 38 is preferably defined by the outer circumferential face 24 of the stator core 22 and is therefore substantially curved.

Although the first, second, and third stator margins 34, 36, 38 are preferably at least in part structurally defined, continuous structural definition is not required according to some aspects of the present invention. Furthermore, it is permissible according to some aspects of the present invention for the stator margins to be defined solely in relation to structure rather that in whole or in part by structure itself.

In a preferred embodiment, as illustrated, the motor 12 is an inner rotor motor. It is permissible, however, for an outer rotor motor, a dual rotor motor, or an otherwise alternatively configured motor to be used.

Figure 3:
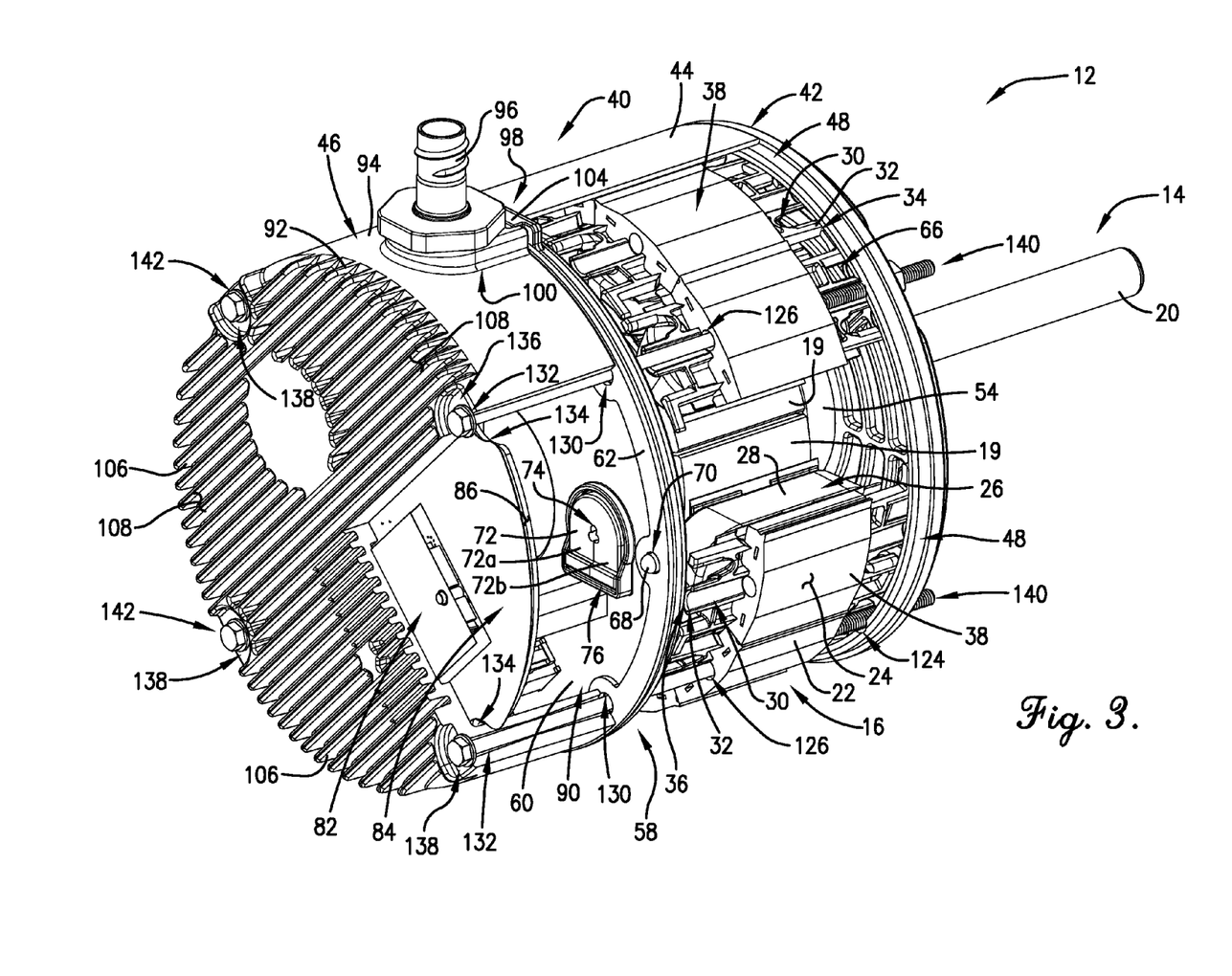
FIG. 3 is a partially fragmented bottom perspective view of the motor of FIG. 2, particularly illustrating the internal motor components and the extension of fasteners through the controller can, the first and second endshields, and the stator.
Figure 4:
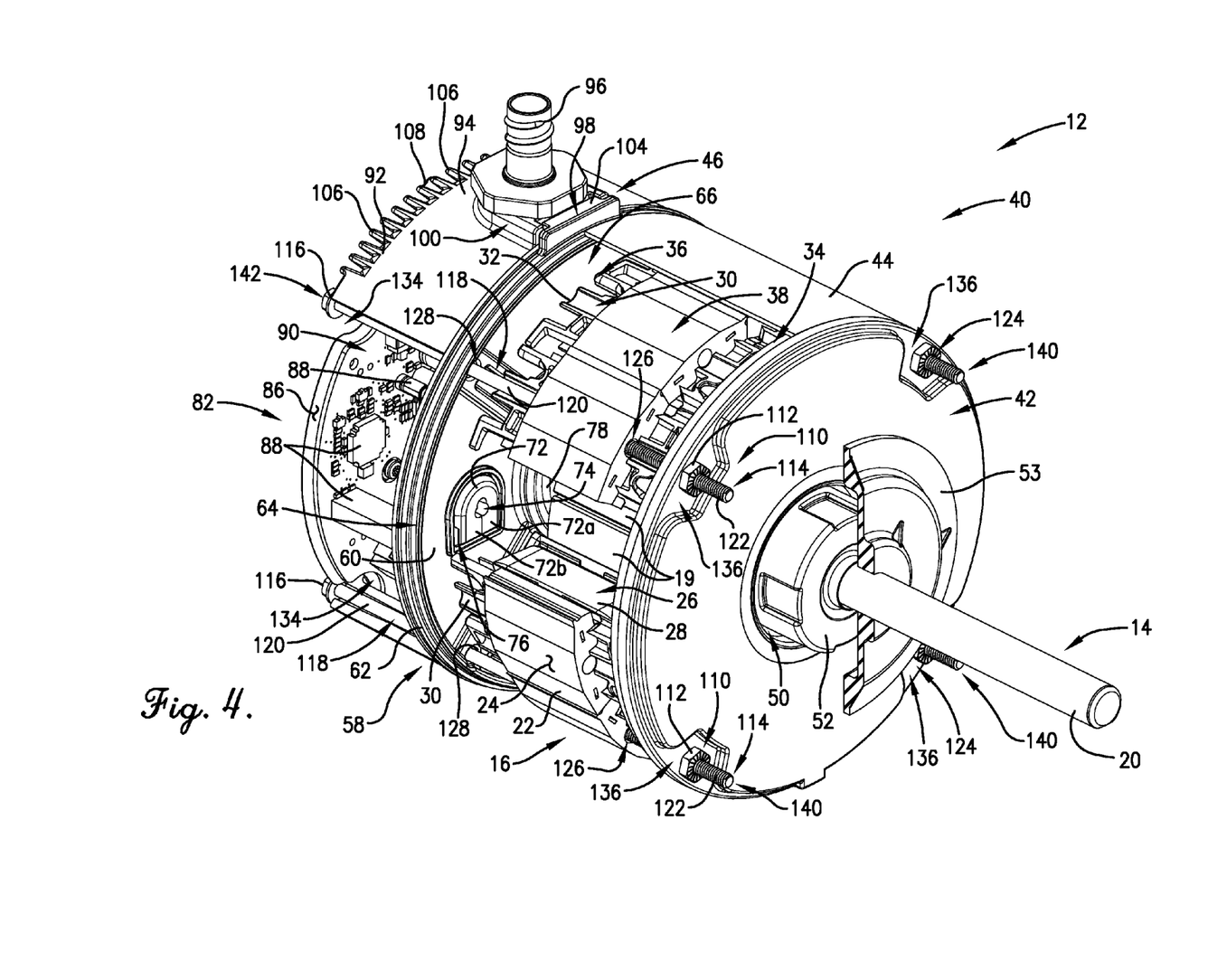
FIG. 4 is a partially fragmented top perspective view of the motor of FIGS. 2 and 3, particularly illustrating the projection of the fasteners axially beyond the first endshield for connection to the machine.

The motor 12 further preferably includes a housing 40 broadly including a first endshield 42, a shell 44, and a controller can 46. As best shown in FIGS. 3 and 4, the stator 16 is positioned axially between the first endshield 42 and the can 46. The shell 44 is preferably likewise positioned axially between the first endshield 42 and the can 46.

More particularly, the first endshield 42 preferably extends along the first stator margin 34, while the shell 44 preferably extends along the third stator margin 38. That is, the first endshield 42 preferably extends generally radially adjacent the first stator margin 34, while the shell 44 preferably extends generally circumferentially adjacent the third stator margin 38 so as to at least in part circumscribe the stator 16.

The first endshield 42 preferably defines a generally circumferentially extending recess 48 (best shown in FIGS. 3 and 5) adjacent its perimeter. The shell 44 is preferably at least in part received by the recess 48, such that the shell 44 and the first endshield 42 cooperatively at least in part enclose the stator 16. Alternative interconnection means are permissible according to some aspects of the present invention, however. For instance latches or other fasteners might be provided to secure the shell to the first endshield.

The first endshield 42 preferably defines a shaft opening 50. The shaft 20 preferably extends through the shaft opening 50.

More particularly, as best shown in FIG. 5, the first endshield 42 preferably defines a first bearing-receiving structure 54 that at least in part defines the shaft opening 50. A first bearing 56, shown in FIG. 5, is preferably received in the first bearing-receiving structure 54. The first bearing 56 preferably at least in part rotatably supports the shaft 20 in the motor 12.

The first bearing 56 may be of any type suited to the particular application. For instance, the first bearing might be a bushing or a ball bearing.

As shown in FIGS. 4 and 5, a bearing cap or seal 52 is preferably provided adjacent the shaft opening 50. The cap 52 preferably prevents passage of contaminants through the shaft opening 50 to the first bearing 56.

As also shown in FIGS. 1, 4, and 5, an umbrella-like water slinger 53 is preferably provided adjacent the bearing cap 52. As best shown in FIG. 1, the slinger 53 preferably spans a substantial portion of the first endshield 42, although the relative dimensions of the first endshield and the slinger may vary without departing from the scope of the present invention.

The water slinger 53 is preferably configured to rotate with the shaft 20, such that fluid contacting the slinger 53 during operation of the motor 12 is flung away from the motor 12.

Preferably, the shell 44 extends continuously and fully circumferentially about the stator 16. Furthermore, the shell 44 and the first endshield 42 (with the exception of the shaft opening 50) are preferably at least substantially solid in construction. Passage of contaminants through the shell 44 and/or the first endshield 42 to the stator 16 is thereby at least substantially restricted. It is permissible according to some aspects of the present invention, however, for openings to be formed in either or both of the shell and the first endshield for any one or more of a variety of purposes, including but not limited to heat dispersion or ventilation. Furthermore, partial extension and/or discontinuous extension of the shell is permissible according to some aspects of the present invention.

The housing 40 further preferably includes a seal assembly 58 positioned between the shell 44 and the can 46. The seal assembly 58 preferably includes a second endshield 60 and a gasket 62. As will be discussed in greater detail below, the seal assembly 58 preferably engages and seals or closes off the can 46.

Figure 7:
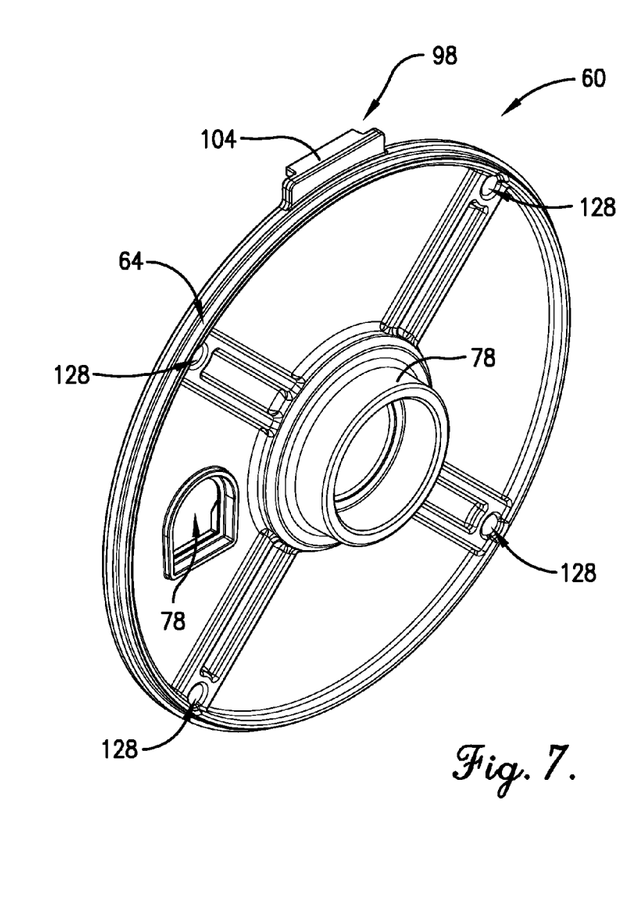
FIG. 7 is a top perspective view of the second endshield of FIG. 6, particularly illustrating the alignment component, the circumferentially extending recess, the second endshield fastener-receiving openings, the grommet-receiving opening, and the bearing-receiving projection.
Figure 8:
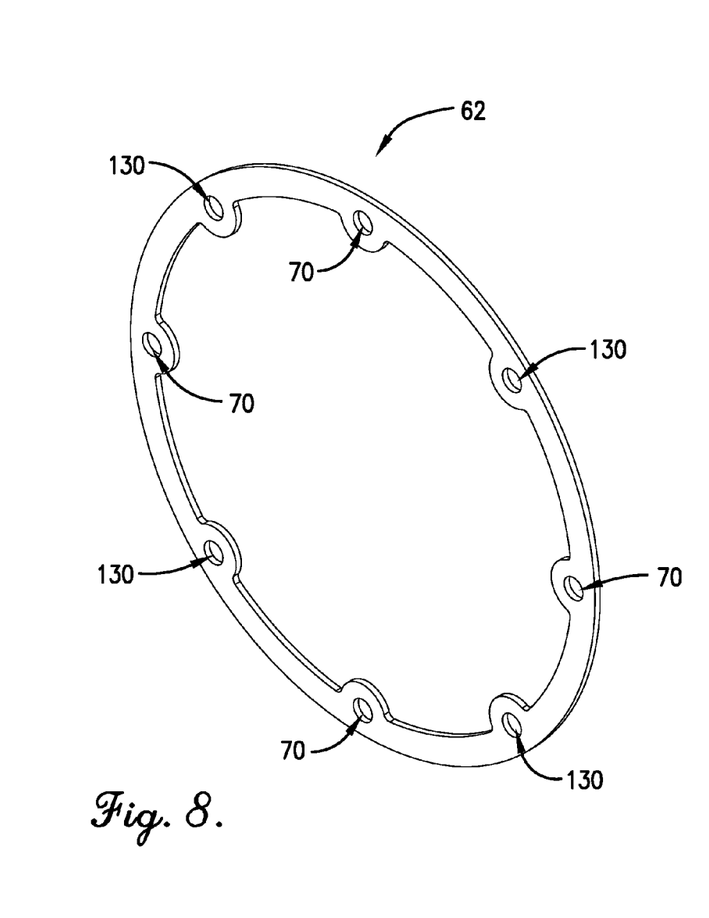
FIG. 8 is an enlarged perspective view of the gasket of FIGS. 1-5.
Figure 11:
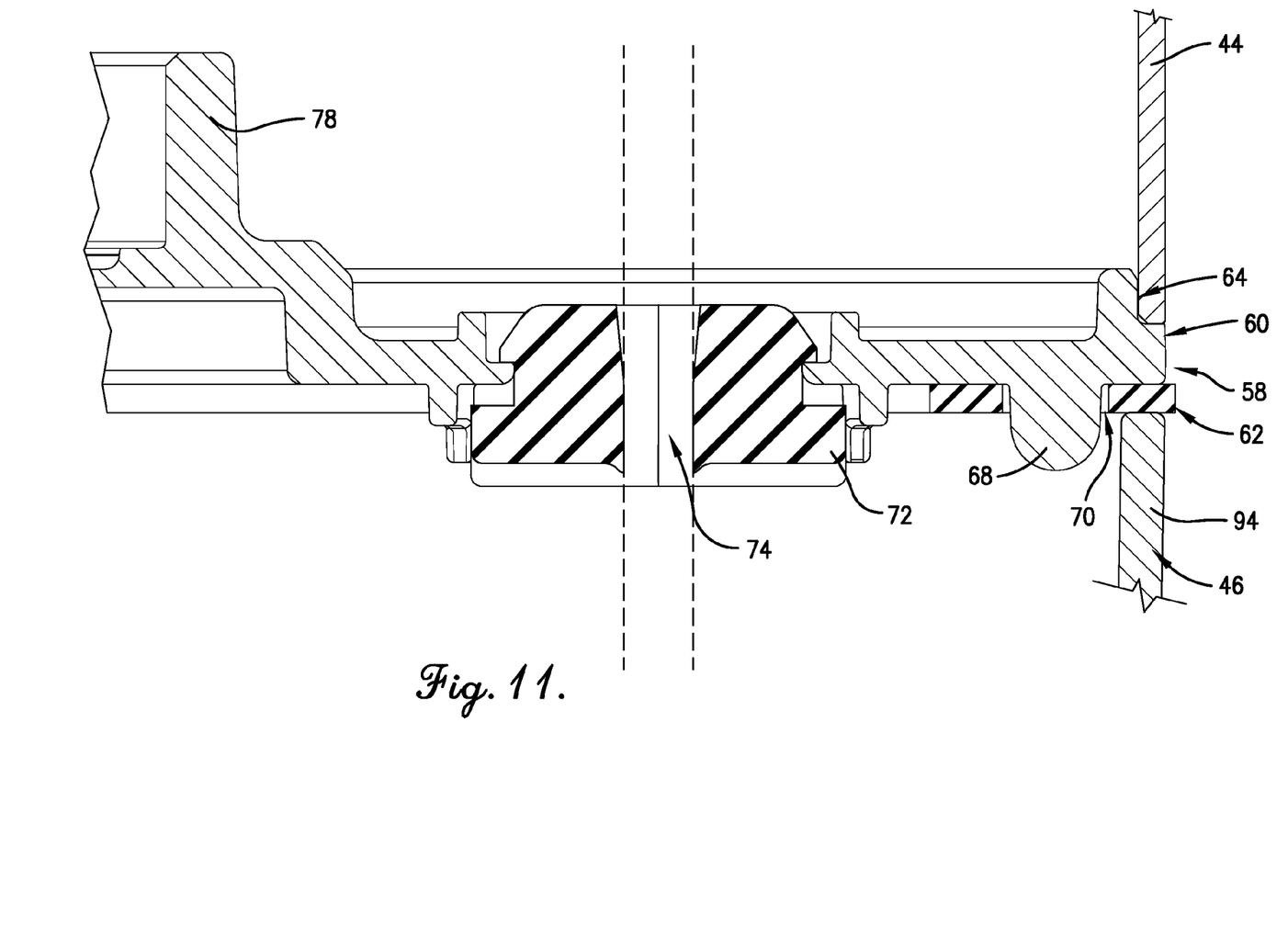
FIG. 11 is an enlarged side cross-sectional view of a portion of the motor of FIGS. 1-5, particularly illustrating the interengagement of the shell, the second endshield, the gasket, the grommet, and the skirt of the end cap.

The second endshield 60 preferably extends generally radially along the second stator margin 36 and presents a generally circumferentially extending recess 64 (best shown in FIGS. 4, 7, and 11) adjacent its perimeter.

The shell 44 is preferably at least in part received by the recess 64, such that the shell 44 and the second endshield 60 cooperatively at least in part enclose the stator 16. Thus, the first endshield 42, the second endshield 60, and the shell 44 cooperatively at least substantially define a stator compartment 66 and at least substantially enclose the stator 16 therein.

It is noted that alternative interconnection means are permissible according to some aspects of the present invention. For instance latches or other fasteners might be provided to secure the shell to the second endshield.

Figure 6:
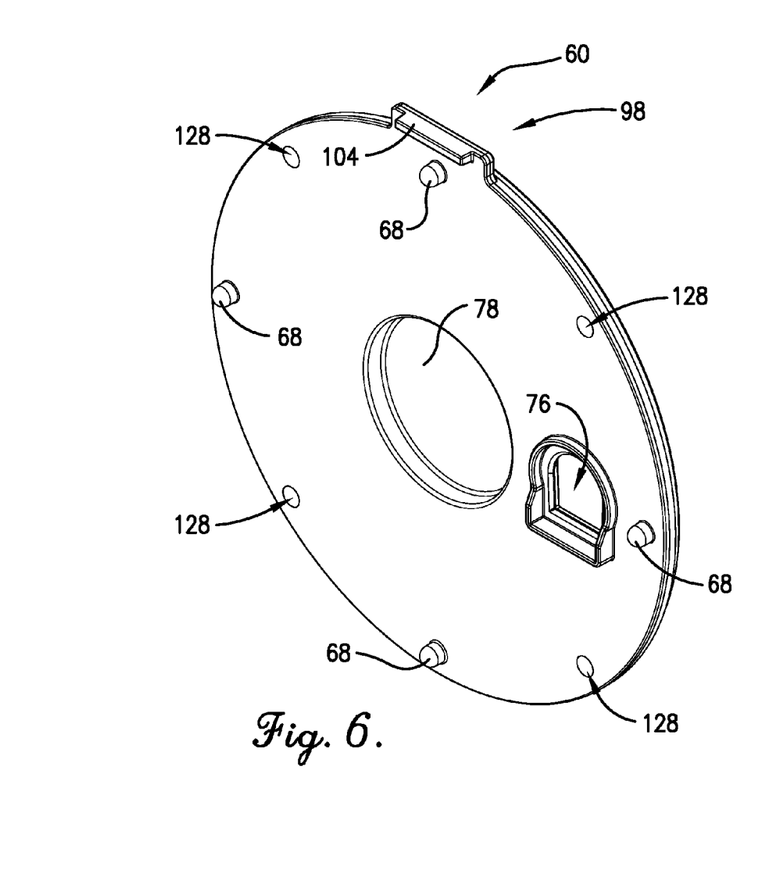
FIG. 6 is an enlarged bottom perspective view of the second endshield of FIGS. 3-5, particularly illustrating the alignment component, the second endshield fastener-receiving openings, the nubs, and the grommet-receiving opening.

As best shown in FIGS. 5 and 6, the second endshield 60 preferably includes a plurality of arcuately space apart nubs 68 adjacent the perimeter thereof. The gasket 62 preferably includes a corresponding set of nub-receiving openings 70. The nub-receiving openings 70 preferably receive the nubs 68 so as to position the gasket 62 and the second endshield 60 relative to each other.

Figure 9:
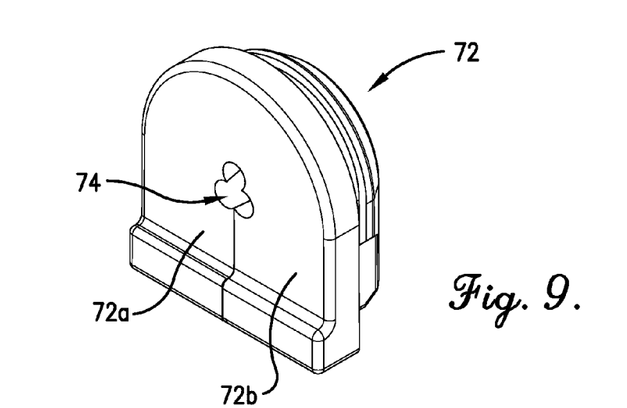
FIG. 9 is a bottom perspective view of the grommet of FIGS. 3-5.
Figure 10:
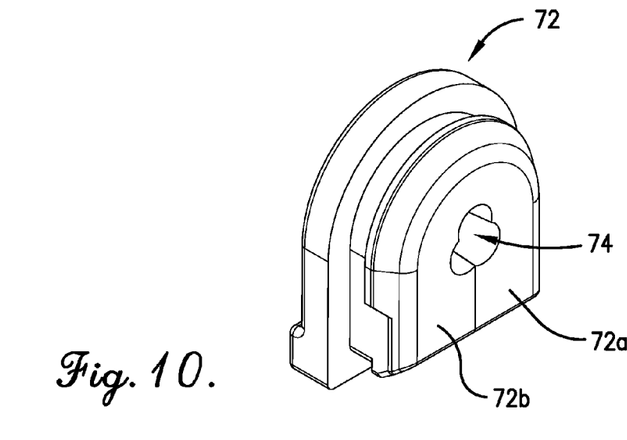
FIG. 10 is a top perspective view of the grommet of FIG. 9.

The seal assembly 58 further preferably includes a grommet 72, shown in detail in FIGS. 9 and 10. The grommet 72 preferably defines a wire-receiving opening 74 therethrough, with a portion of the electrical wiring 28 extending through the wire-receiving opening 74. Furthermore, the grommet 72 preferably defines a pair of arms 72a,72b.

The second endshield 60 preferably defines a grommet-receiving opening 76, with the grommet 72 being received in the grommet-receiving opening 76. The grommet-receiving opening 76 is preferably undersized relative to the grommet 72, such that the grommet 72 is subject to compression.

Most preferably, the grommet 72 is formed of a deformable material, such that the compression applied thereto by the grommet-receiving opening 76 results in compressive deformation of the grommet 72. Such compressive deformation preferably at least substantially seals the interface between the grommet 72 and the wiring 28 so as to prevent fluid leakage through the wire-receiving opening 74. That is, the grommet 72 is squeezed at least substantially tightly about the wiring 28. Preferably, leakage around the outside of the grommet 72 is likewise at least substantially prevented.

Preferably, the grommet 72 in its non-stressed state (not shown) is generally V-shaped. That is, prior to deformation as a result of compressive forces, the arms 72a,72b are preferably spaced apart in a V-shape, with the opening 74 being non-enclosed.

The second endshield 60 preferably defines a second bearing-receiving structure 78. A second bearing 80 (shown in FIG. 5) is preferably received in the second bearing-receiving structure 78. The second bearing 80 preferably cooperates with the first bearing 56 to rotatably support the shaft 20 and other rotor 14 components in the motor 12.

The second bearing 80 may be of any type suited to the particular application. For instance, the second bearing might be a bushing or a ball bearing.

The motor 12 preferably includes a controller 82. In a preferred embodiment, the controller 82 includes a printed circuit board 84 presenting an outer perimeter 86. The controller 82 further preferably includes a plurality of electronics components 88 mounted on the printed circuit board 84. However, any of a variety of controller types and configurations are permissible according to some aspects of the present invention.

The can 46 preferably at least in part defines a controller compartment 90 in which the controller 82 is received.

The can 46 preferably includes a generally radially extending end plate 92 and a generally axially extending skirt 94 projecting from the end plate 92 toward the shell 44 so as to at least substantially circumscribe the controller 82.

Preferably, the can 46 is at least substantially solid in construction such that passage of contaminants therethrough to the controller 82 is restricted. Furthermore, the skirt 94 is preferably at least substantially solid in construction and extends continuously and fully circumferentially about the controller 82 such that passage of contaminants therethrough to the controller 82 is restricted. Most preferably, the can 46 is solid so as to be capable of being sealed to thereby reduce the risk of any moisture entering the controller compartment 90. However, it is permissible according to some aspects of the present invention for openings to be formed in either or both of the end plate and the skirt of the can for any one or more of a variety of purposes, including but not limited to heat dispersion or ventilation. Furthermore, partial extension and/or discontinuous extension of the skirt fall within the ambit of the present invention The shell 44 presents a shell diameter. Preferably, the shell diameter is at least substantially constant, although variation is permissible within the scope of the present invention. For instance, the shell might expand in a linear manner or be flared.

The can 46 presents a can diameter. Preferably, the can diameter is at least substantially constant, although variation is permissible within the scope of the present invention. For instance, the skirt of the can might expand in a linear manner or be flared.

Preferably, the can diameter and the shell diameter are at least substantially equal at their adjacent ends. That is, the can diameter immediately adjacent the seal assembly 58 is preferably at least substantially equal to the shell diameter immediately adjacent the seal assembly 58. Yet further, the second endshield 60 and the gasket 62 of the seal assembly 58 preferably each present respective diameters that are at least substantially equal to the immediately adjacent shell and can diameters. Thus, a generally smooth outer surface is defined at the junction of the skirt 94, the gasket 62, the second endshield 60, and the shell 44.

As noted previously, the seal assembly 58 preferably engages and seals or closes off the controller can 46. That is, ingress of contaminants such as environmental moisture through the seal assembly 58 and into the controller compartment 90 is at least substantially prevented. Furthermore, ingress of contaminants from the stator compartment 66 to the controller compartment 90 or transfer of contaminants from the controller compartment 90 to the stator compartment 66 is at least substantially prevented.

In a preferred embodiment, a connector element 96 is connected to the can 46. The connector element 96 is preferably configured for interconnection with an electrical conduit, although it is within the scope of the present invention for the element to be configured for any required connection or to be excluded entirely from the motor. It is also permissible for the element to connect to the motor or housing at an alternative location.

In a preferred embodiment, the second endshield 60 and the can 46 include complemental alignment components 98 and 100, respectively. More particularly, the alignment component 100 of the can 46 defines a recess 102 (best shown in FIG. 5), and the alignment component 98 of the second endshield 60 includes a projection 104 that is received within the recess 102. Rotation of the second endshield 60 and the can 46 relative to each other is at least substantially prevented when the projection 104 is received within the recess 102. Proper rotational alignment is desirable for efficient wiring; that is, the wire-receiving opening 74 of the grommet 72 should be positioned for optimal passage of wiring 28 between the controller 82 and the stator 16. Similarly, controlled positioning of the connector element 96 is desirable.

The previously described connector element 96 is preferably connected to the alignment component 98 of the can 46. As noted above, however, alternate connection locations are permissible.

In a preferred embodiment, the can 46 includes a plurality of fins 106 extending generally axially from the end plate 92. The fins 106 are configured to disperse heat from the controller 82.

Preferably, the fins 106 extend over substantially the entire end plate 92 and cooperatively define an at least substantially flat, generally radially extending endmost surface 108. The surface 108 is configured to enable flush mounting against the machine 10 and/or other adjacent structures as required by the particular machine configuration and application.

Preferably, the motor 12 further includes at least one fastener 110 interconnecting the stator 16 and the housing 40. More preferably, the motor 12 includes a plurality of fasteners 110 interconnecting the stator 16 and the housing 40.

In particular, the fasteners 110 preferably extend through and interconnect the first endshield 42, the stator 16, and the can 46. The fasteners 110 preferably additionally interconnect the seal assembly 58 (and, more particularly, the second endshield 60 and the gasket 62) to the first endshield 42, the stator 16, and the can 46.

Preferably, the fasteners 110 are arcuately spaced apart. More preferably, the fasteners 110 are evenly arcuately spaced apart. Alternative arrangements, including irregular arrangements, are permissible according to some aspects of the present invention, however.

Preferably, the fasteners 110 are at least substantially identical to each other. More particularly, each fastener 110 preferably includes a nut 112 and a bolt 114. Each bolt 114 preferably includes a head 116 and a shaft 118, wherein the shaft 118 includes a smooth portion 120 adjacent the head 116 and a threaded portion 122 spaced from the head 116. The threaded portion 122 is configured to receive the corresponding nut 112. However, it is permissible according to some aspects of the present invention for the fasteners to be of a different type or of varying types.

In keeping with the above preferred fastener 110 configuration, the first endshield 42 preferably includes a plurality of first endshield fastener-receiving openings 124, the stator preferably includes a plurality of stator fastener-receiving openings 126, the second endshield preferably includes a plurality of second endshield fastener-receiving openings 128, the gasket 62 preferably includes plurality of gasket fastener-receiving openings 130, and the can 46 preferably includes plurality of can fastener-receiving openings 132. Furthermore, the controller 82 preferably includes a plurality of cutouts 134 to allow passage of the fasteners 110 thereby.

Each fastener 110 preferably extends through a corresponding first endshield fastener-receiving opening 124, a corresponding stator fastener-receiving opening 126, a corresponding second endshield fastener-receiving opening 128, a corresponding gasket fastener-receiving opening 130, and a corresponding can fastener-receiving opening 132. Such extension may involve engagement or lack thereof between the fastener 110 and the structures defining the corresponding openings 124,126,128,130,132, as appropriate to the particular application. For instance, a loose fit, a slip fit, or a press fit might be used, or complementary threads might be provided. The same fit might be used for each fastener and/or within each opening, or the fit type might vary. It is preferred, however, that the fit types be the same for each fastener/openings set to enable ease of assembly.

In a preferred embodiment and as best shown in FIG. 4, the first endshield 42 defines a plurality of first endshield recesses 136 corresponding to the first endshield fastener-receiving openings 124. Similarly, the end plate 92 of the can 46 defines a plurality of end plate recess 138 corresponding to the can fastener-receiving openings 132.

Preferably, each fastener 110 projects axially beyond at least one of the first endshield 42 and the can 46 for connection to the machine. Most preferably, each fastener 110 presents a first end 140 and a second end 142. The first end 140 of each fastener 110 preferably projects axially beyond only one of the first endshield 42 and the can 46, while the second end 142 of each fastener 110 is preferably contained within a corresponding first endshield recess 136 or end plate recess 138 of the other of the first endshield 42 and the can 46. For instance, as best illustrated in FIGS. 1-4, the head 116 of the bolt 114 (i.e., the second end 142) of each fastener 110 is preferably contained within a corresponding one of the end plate recesses 138, while a portion of the threaded end of each bolt 114 (i.e., the first end 140) projects axially beyond the first endshield 42 for connection to the machine 10.

Similarly, the shaft 20 preferably projects axially beyond at least one of the first endshield 42 and the can 46. Most preferably, the shaft 20 projects axially beyond only one of the first endshield 42 and the can 46. For instance, in the first preferred embodiment and as illustrated in FIGS. 1-4, the shaft 20 projects axially beyond the first endshield 42 and into the machine 10. That is, the shaft 20 and the fasteners 110 project axially from the same end of the housing 40, such that the motor 12 is mounted in a shaft up configuration.

It is permissible according to some aspects of the present invention for an alternative shaft up configuration to be implemented. For instance, the heads of the bolts might be contained within the first endshield recesses, while both the shaft and a portion of the threaded end of each bolt project axially beyond the can for connection to the machine. (Such an embodiment would of course require the formation of a shaft opening through both the controller and the can.)

The preferred embodiment described above provides numerous advantages. Among other things, for instance, both the stator compartment 66 and the controller compartment 90 are at least substantially sealed against ingress of moisture or other contaminants from the environment. The sealed arrangement enables the use of a shaft up motor configuration, in which the can 46 forms an upward-opening bowl at the bottom of the motor 12, without leading to gravitational dripping of moisture into the can 46 and potential damage to the controller 82 housed therein as a result.

Figure 12:
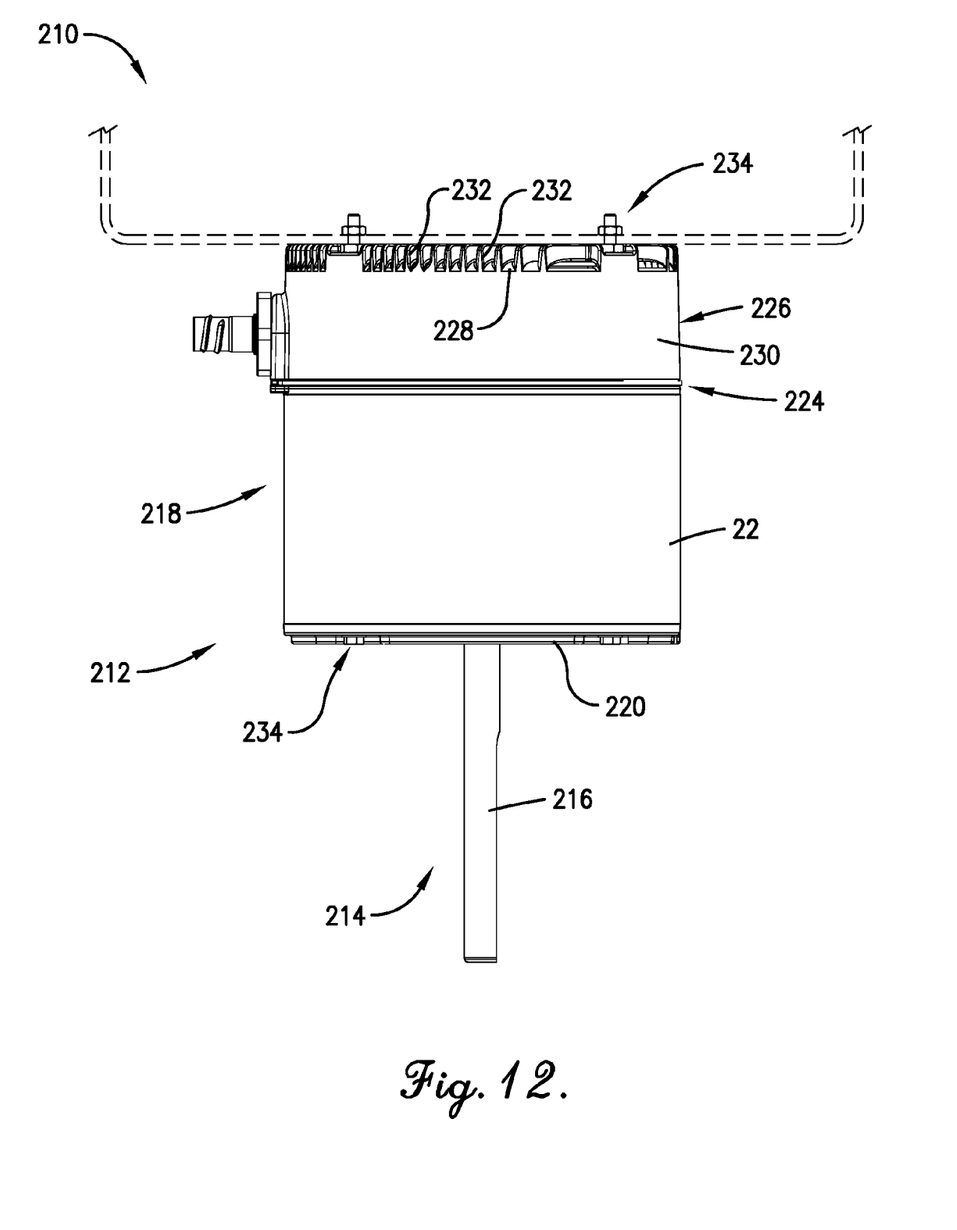
FIG. 12 is a side view of a machine and motor in accordance with a second preferred embodiment of the present invention, wherein the motor is mounted on the machine in a shaft down configuration.

A second preferred machine and motor, particularly depicting a shaft down configuration, are illustrated in FIG.

12. It is initially noted that, with certain exceptions to be discussed in detail below, many of the elements of the machine 210 and the motor 212 of the second embodiment are the same as or very similar to those described in detail above in relation to the machine 10 and the motor 12 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

With initial reference to FIG. 12, a machine 210 is provided. An electric motor 212 is mounted to the machine 210. The motor 212 includes a rotor 214 including a shaft 216. The motor 212 also includes a stator (not shown).

The motor 212 further includes a housing 218 including a first endshield 220, a shell 222, a seal assembly 224, and a controller can 226. The can 226 preferably includes a generally radially extending end plate 228 and a generally axially extending skirt 230 projecting from the end plate 228 toward the shell 222.

The can 226 preferably includes a plurality of fins 232 extending generally axially from the end plate 228.

The motor 212 preferably includes a plurality of fasteners 234. Preferably, each fastener 234 projects axially beyond at least one of the first endshield 220 and the can 226 for connection to the machine 210. More particularly, in the second preferred embodiment, each fastener 234 projects axially beyond the can 226 for the connection to the machine 210.

Similarly, the shaft 216 preferably projects axially beyond at least one of the first endshield 220 and the can 226. More particularly, in the second preferred embodiment, the shaft 216 projects axially beyond the first endshield 220 and thus away from the machine 210. That is, the shaft 216 and the fasteners 234 project axially from opposite ends of the housing 218, such that the motor 212 is mounted in a shaft down configuration.

It is permissible according to some aspects of the present invention for an alternative shaft down configuration to be implemented. For instance, the shaft might project axially beyond the can and away from the machine, while the fasteners project axially beyond the first endshield. (Such an embodiment would of course require the formation of a shaft opening through both the controller and the can.)

It is also permissible according to some aspects of the present invention for additional features to be provided to enable improved drainage of fluid from any one or more of the components encompassed by the housing (e.g., a controller on which excessive condensation has formed). For instance, one or more drain holes (not shown) might be provided in the first endshield.

Figure 13:
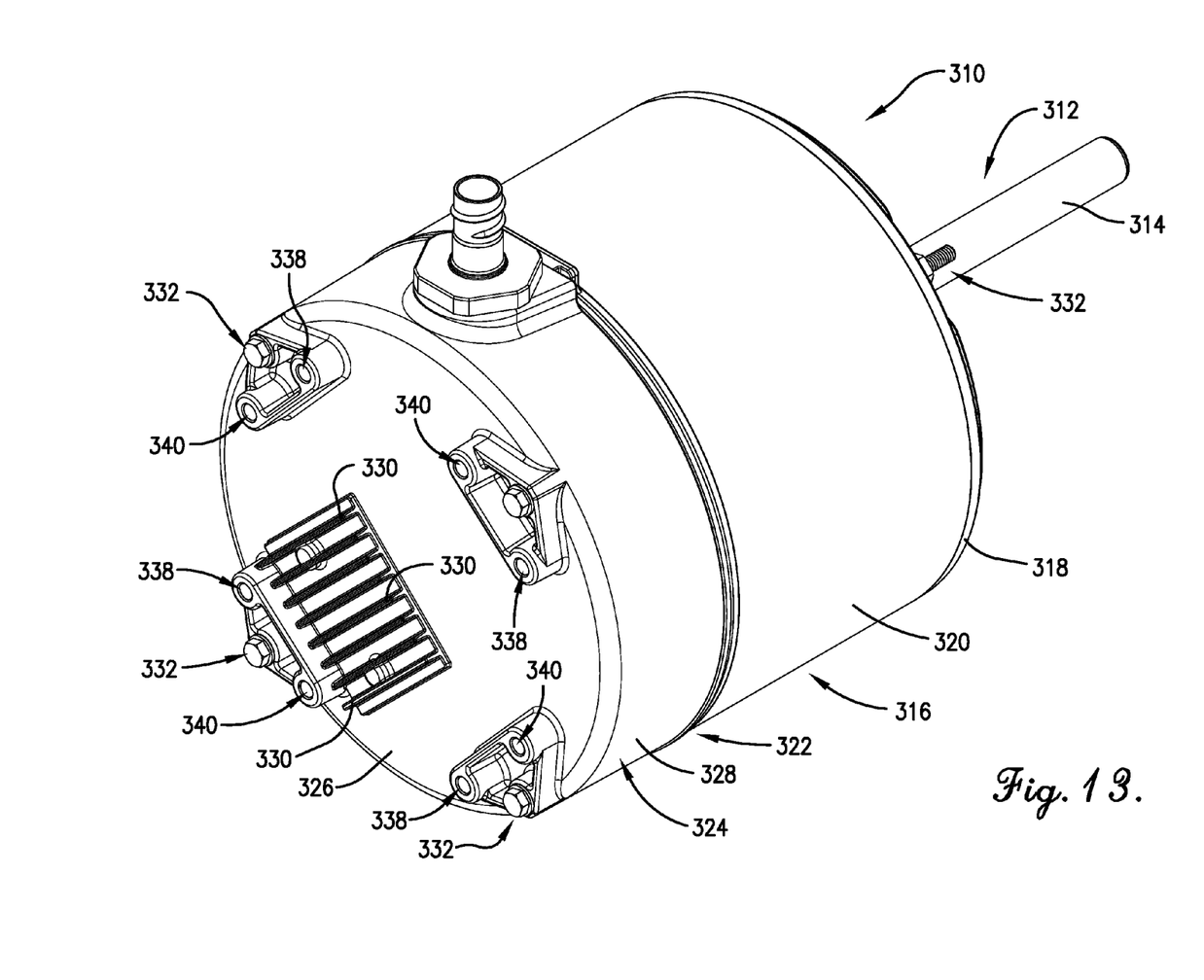
FIG. 13 is a top perspective view of a motor in accordance with a third preferred embodiment of the present invention, wherein the motor includes an alternative end cap and is configured for mounting in a shaft up or shaft down configuration.
Figure 14:
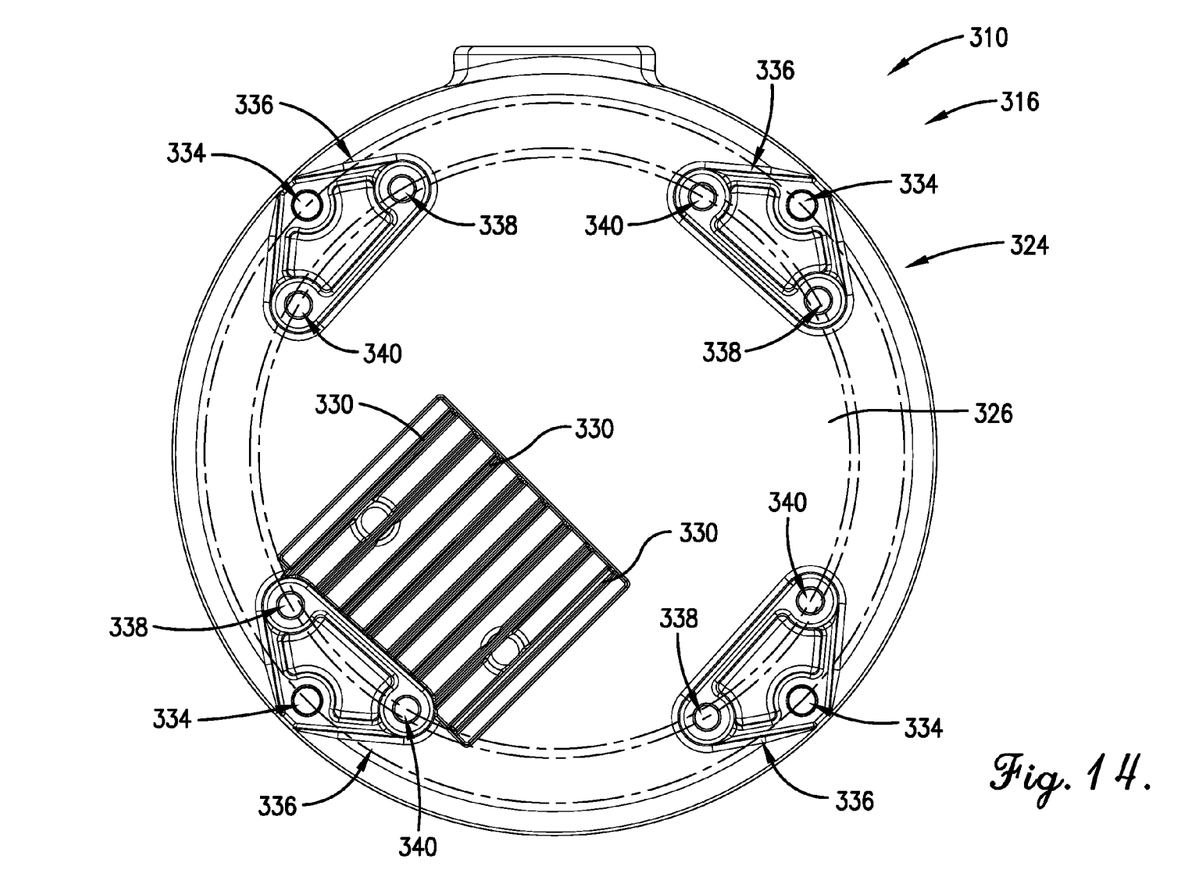
FIG. 14 is a top view of the motor of FIG. 13, particularly illustrating the presence of one set of fastener-receiving openings and two sets of connector-receiving openings.

A third preferred embodiment, particularly depicting a motor with an alternative end cap, is illustrated in FIGS. 13 and 14. It is initially noted that, with certain exceptions to be discussed in detail below, many of the elements of the motor 310 of the third embodiment are the same as or very similar to those described in detail above in relation to the motor 12 of the first embodiment and the motor 212 of the second embodiment. Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

With initial reference to FIG. 13, an electric motor 310 is provided. The motor 310 includes a rotor 312 including a shaft 314. The motor 310 also includes a stator (not shown).

The motor 310 further includes a housing 316 including a first endshield 318, a shell 320, a seal assembly 322, and a controller can 324. The can 324 preferably includes a generally radially extending end plate 326 and a generally axially extending skirt 328 projecting from the end plate 326 toward the shell 320.

The end plate 326 preferably includes a plurality of fins 330 extending generally axially therefrom. The fins 330 are preferably configured to disperse heat and preferably extend only over a portion of the end plate 326, such that the end plate 326 is at least substantially devoid of fins 330. More substantial or even substantially complete coverage is acceptable according to some aspects of the present invention, however.

The motor 310 preferably includes a plurality of fasteners 332. As best shown in FIG. 14, the end plate 326 preferably defines a plurality of fastener-receiving openings 334. Preferably, the end plate 326 defines a plurality of mounting structures 336, each of which at least in part defines one of the fastener-receiving openings 334.

Preferably, each fastener 332 projects axially beyond at least one of the first endshield 318 and the can 324 for connection to the machine (not shown). More particularly, in the third preferred embodiment, each fastener 332 projects axially beyond the first endshield 318 for connection to the machine (not shown).

Similarly, the shaft 314 preferably projects axially beyond at least one of the first endshield 318 and the can 324. More particularly, in the third preferred embodiment, the shaft 314 projects axially beyond the first endshield 318. That is, in the illustrated embodiment, the shaft 314 and the fasteners 332 project axially from the same end of the housing 316. The motor 310 is therefore mountable in a shaft up configuration through use of the fasteners 332.

It is permissible, however, for the motor 310 to instead be mounted to the machine in a shaft down configuration. More particularly, the mounting structures 336 further preferably define a plurality of outer connector-receiving openings 338 and a plurality of inner connector-receiving openings 340. The outer and inner connector-receiving openings 338,340 are preferably configured to receive connectors (not shown) for attaching the motor 310 to a cradle or to other components (not shown), as appropriate for the particular application.

Each set of openings 334,338,340 is preferably arranged arcuately about a progressively smaller diameter circle, although it is permissible according to some aspects of the present invention for alternate arrangements to be provided. (For clarity, the circles are denoted in FIG. 14 by broken lines.)

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description. For instance, shaft up mounting of a motor including the can of the third preferred embodiment is permissible according to some aspects of the present invention, as is the provision of connector-receiving holes arranged about multiple diameters on the can of the first and second preferred embodiments.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. An electric motor mountable to a machine, said motor comprising:
    a rotor rotatable about an axis;
    a stator;
    a housing including a first endshield and a controller can, with the stator being positioned axially between the first endshield and the can;
    a fastener extending through and interconnecting the first endshield, the stator, and the can,
    wherein said fastener projects axially beyond at least one of the first endshield and the can for connection to the machine; and
    a shell at least partly circumscribing the stator and positioned between the first endshield and the can,
    wherein said housing further includes a seal assembly positioned between the shell and the can,
    wherein said seal assembly seals the can,
    wherein said seal assembly includes a second endshield and a gasket,
    wherein said second endshield includes a plurality of arcuately spaced apart nubs,
    wherein said gasket includes a plurality of arcuately spaced apart nub-receiving openings corresponding to and receiving the nubs.

2. The motor of claim 1,
    wherein said seal assembly includes a fastener-receiving opening,
    wherein said fastener extends through the fastener-receiving opening such that the seal assembly is interconnected to the first endshield, the stator, and the can.

3. The motor of claim 1,
    wherein said shell has a shell diameter,
    wherein said can has a can diameter,
    wherein said shell diameter and said can diameter are equal.

4. An electric motor mountable to a machine, said motor comprising:
    a rotor rotatable about an axis;
    a stator;
    a housing including a first endshield and a controller can, with the stator being positioned axially between the first endshield and the can;
    a fastener extending through and interconnecting the first endshield, the stator, and the can,
    wherein said fastener projects axially beyond at least one of the first endshield and the can for connection to the machine; and
    a shell at least partly circumscribing the stator and positioned between the first endshield and the can,
    wherein said housing further includes a seal assembly positioned between the shell and the can,
    wherein said seal assembly seals the can,
    wherein said seal assembly includes a second endshield and a gasket,
    wherein said second endshield and said can include complemental alignment components.

5. The motor of claim 4,
    wherein said seal assembly includes a fastener-receiving opening,
    wherein said fastener extends through the fastener-receiving opening such that the seal assembly is interconnected to the first endshield, the stator, and the can.

6. The motor of claim 4,
    wherein said shell has a shell diameter,
    wherein said can has a can diameter,
    wherein said shell diameter and said can diameter are equal.

7. An electric motor mountable to a machine, said motor comprising:
    a rotor rotatable about an axis;
    a stator;
    a housing including a first endshield and a controller can, with the stator being positioned axially between the first endshield and the can;
    a fastener extending through and interconnecting the first endshield, the stator, and the can,
    wherein said fastener projects axially beyond at least one of the first endshield and the can for connection to the machine; and
    a shell at least partly circumscribing the stator and positioned between the first endshield and the can,
    wherein said housing further includes a seal assembly positioned between the shell and the can,
    wherein said seal assembly seals the can,
    wherein said seal assembly includes a second endshield and a gasket,
    wherein said seal assembly further includes a grommet defining a wire-receiving opening therethrough,
    wherein said motor further includes electrical wiring extending through the wire-receiving opening,
    wherein said grommet is subject to compression, such that fluid leakage through the wire-receiving opening is avoided.

8. The motor of claim 7,
    wherein said second endshield includes a circumferentially extending recess,
    wherein said shell is at least in part received in the recess.

9. The motor of claim 7,
    wherein said second endshield defines a grommet-receiving opening therethrough,
    wherein said grommet is received in the grommet-receiving opening,
    wherein said grommet-receiving opening is undersized relative to the grommet, such that the grommet is compressed.

10. The motor of claim 7,
    wherein said seal assembly includes a fastener-receiving opening,
    wherein said fastener extends through the fastener-receiving opening such that the seal assembly is interconnected to the first endshield, the stator, and the can.

11. The motor of claim 7,
    wherein said stator presents a first generally radially extending stator margin,
    wherein said first endshield extends along the first stator margin,
    wherein said shell and said first endshield cooperatively at least in part enclose the stator.

12. The motor of claim 7,
wherein said shell has a shell diameter,
wherein said can has a can diameter,
wherein said shell diameter and said can diameter are equal.

13. The motor of claim 7,
wherein said motor comprises a plurality of said fasteners.

14. The motor of claim 13,
wherein said fasteners are at least substantially evenly arcuately spaced apart.

15. The motor of claim 7, further comprising:
a controller at least in part enclosed within the can.

16. The motor of claim 15,
wherein said controller presents a generally radially extending controller margin,
wherein said can includes—
  a generally radially extending end plate extending along the controller margin, and
  a generally axially extending skirt projecting from the end plate toward the shell and at least partly circumscribing the controller.

17. The motor of claim 7,
wherein said rotor includes a shaft,
wherein said shaft projects axially beyond at least one of the first endshield and the can.

18. The motor of claim 7,
wherein said second endshield includes a plurality of arcuately spaced apart nubs,
wherein said gasket includes a plurality of arcuately spaced apart nub-receiving openings corresponding to and receiving the nubs.

19. The motor of claim 18,
wherein said second endshield and said can include complemental alignment components.

20. The motor of claim 19, further comprising:
a controller at least in part enclosed within the can,
wherein said controller presents a generally radially extending controller margin,
wherein said can includes—
  a generally radially extending end plate extending along the controller margin, and
  a generally axially extending skirt projecting from the end plate toward the shell and at least partly circumscribing the controller,
  wherein said can further includes a plurality of fins extending generally axially from the end plate,
  wherein said fins are configured to disperse heat from the controller.

21. The motor of claim 18, further comprising:
a controller at least in part enclosed within the can,
wherein said controller presents a generally radially extending controller margin,
wherein said can includes—
  a generally radially extending end plate extending along the controller margin, and
  a generally axially extending skirt projecting from the end plate toward the shell and at least partly circumscribing the controller,
  wherein said can further includes a plurality of fins extending generally axially from the end plate,
  wherein said fins are configured to disperse heat from the controller.

22. The motor of claim 7,
wherein said second endshield and said can include complemental alignment components.

23. The motor of claim 7, further comprising:
a controller at least in part enclosed within the can,
wherein said controller presents a generally radially extending controller margin,
wherein said can includes—
  a generally radially extending end plate extending along the controller margin, and
  a generally axially extending skirt projecting from the end plate toward the shell and at least partly circumscribing the controller,
  wherein said can further includes a plurality of fins extending generally axially from the end plate,
  wherein said fins are configured to disperse heat from the controller.

24. The motor of claim 23,
wherein said second endshield and said can include complemental alignment components.

25. An electric motor mountable to a machine, said motor comprising:
a rotor rotatable about an axis;
a stator;
a housing including a first endshield and a controller can, with the stator being positioned axially between the first endshield and the can;
a fastener extending through and interconnecting the first endshield, the stator, and the can,
wherein said fastener projects axially beyond at least one of the first endshield and the can for connection to the machine;
a shell at least partly circumscribing the stator and positioned between the first endshield and the can; and
a controller at least in part enclosed within the can,
wherein said controller presents a generally radially extending controller margin,
wherein said can includes—
  a generally radially extending end plate extending along the controller margin, and
  a generally axially extending skirt projecting from the end plate toward the shell and at least partly circumscribing the controller,
  wherein said can further includes a plurality of fins extending generally axially from the end plate,
  wherein said fins are configured to disperse heat from the controller.

26. The motor of claim 25,
wherein said housing further includes a seal assembly positioned between the shell and the can,
wherein said seal assembly seals the can.

27. The motor of claim 26,
wherein said seal assembly includes a second endshield and a gasket.

28. The motor of claim 26,
wherein said seal assembly includes a fastener-receiving opening,
wherein said fastener extends through the fastener-receiving opening such that the seal assembly is interconnected to the first endshield, the stator, and the can.

29. The motor of claim 25,
wherein said fins extend over substantially the entire end plate and cooperatively define an at least substantially flat, generally radially extending endmost surface configured for flush mounting against the machine.

30. The motor of claim 29,
wherein said end plate defines at least one recess,
wherein said at least one fastener defines a first end and a second end, wherein said first end is contained within the at least one recess,
wherein said second end projects axially beyond the first endshield.

31. The motor of claim 25,
wherein said controller includes a printed circuit board.

32. The motor of claim 25,
wherein said shell has a shell diameter,
wherein said can has a can diameter,
wherein said shell diameter and said can diameter are equal.

* * * * *